United States Patent
Hirche et al.

(10) Patent No.: US 7,714,459 B2
(45) Date of Patent: May 11, 2010

(54) LOCKING DEVICE FOR A STEERING SHAFT HAVING A SELECTABLE SWITCHING POSITION WHEN THE LOCKING BOLT ARRANGEMENT IS DISPLACED IN THE DIRECTION OF A RELEASE END POSITION

(75) Inventors: Mark Hirche, Velbert (DE); Hans-Joachim Limburg, Schwabenhausen (DE); Horst Zillmann, München (DE); Andreas Van Den Boom, Essen (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 67 days.

(21) Appl. No.: 11/920,688

(22) PCT Filed: Apr. 24, 2006

(86) PCT No.: PCT/EP2006/003750
§ 371 (c)(1),
(2), (4) Date: Feb. 19, 2008

(87) PCT Pub. No.: WO2006/133760
PCT Pub. Date: Dec. 21, 2006

(65) Prior Publication Data
US 2009/0133452 A1   May 28, 2009

(30) Foreign Application Priority Data
Jun. 15, 2005   (DE) .................. 10 2005 027 777

(51) Int. Cl.
B60R 25/02 (2006.01)
(52) U.S. Cl. ........................ 307/10.2; 70/183
(58) Field of Classification Search ............... 307/10.2; 70/183, 186; 180/287
See application file for complete search history.

(56) References Cited

U.S. PATENT DOCUMENTS

| 6,650,075 B2 * | 11/2003 | Otsuka et al. ............... 318/268 |
| 2002/0116962 A1 | 8/2002 | Zillmann |
| 2002/0117841 A1 | 8/2002 | Landmann |
| 2004/0113492 A1 * | 6/2004 | Neuhoff et al. ............. 307/10.2 |

FOREIGN PATENT DOCUMENTS

| DE | 19929435 | 1/2001 |
| DE | 201 03 203 U1 | 8/2001 |
| DE | 199 64 173 C2 | 12/2001 |
| DE | 101 09 609 | 10/2002 |
| EP | 1281589 | 7/2004 |
| JP | 2000233717 | 8/2000 |

* cited by examiner

Primary Examiner—Fritz M Fleming
(74) Attorney, Agent, or Firm—Fay Sharpe LLP

(57) ABSTRACT

A locking device for a steering spindle, includes a locking bolt arrangement and a control element coupled thereto, such that the locking bolt arrangement can be displaced in the axial direction between a locking position and a release end position by rotating the control element. An electronic control unit controls a motor drive and a sensor arrangement, coupled to the control unit for detection of at least one axial position of the locking bolt arrangement. The control unit switches off the motor drive when the locking bolt arrangement is displaced in the axial direction from the locking position to the release end position. The sensor arrangement emits an output signal which displays when a switching off position of the locking bolt arrangement has been reached. The sensor arrangement is so constructed that the output signal can receive a plurality of monotone output signal values which are dependent on the axial position thereof, at least in one displacement interval of the locking bolt arrangement precedent to the release end position and comprising a desired switching position, thus enabling the desired switching position to be selected by selecting an associated output signal value. The control unit includes a selection device which enables one of the desired switching off positions, corresponding to the output signal value as a threshold value to be selected, such that a signal is emitted when the motor drive is switched off, when the threshold value is reached, exceeded or is fallen below.

12 Claims, 7 Drawing Sheets

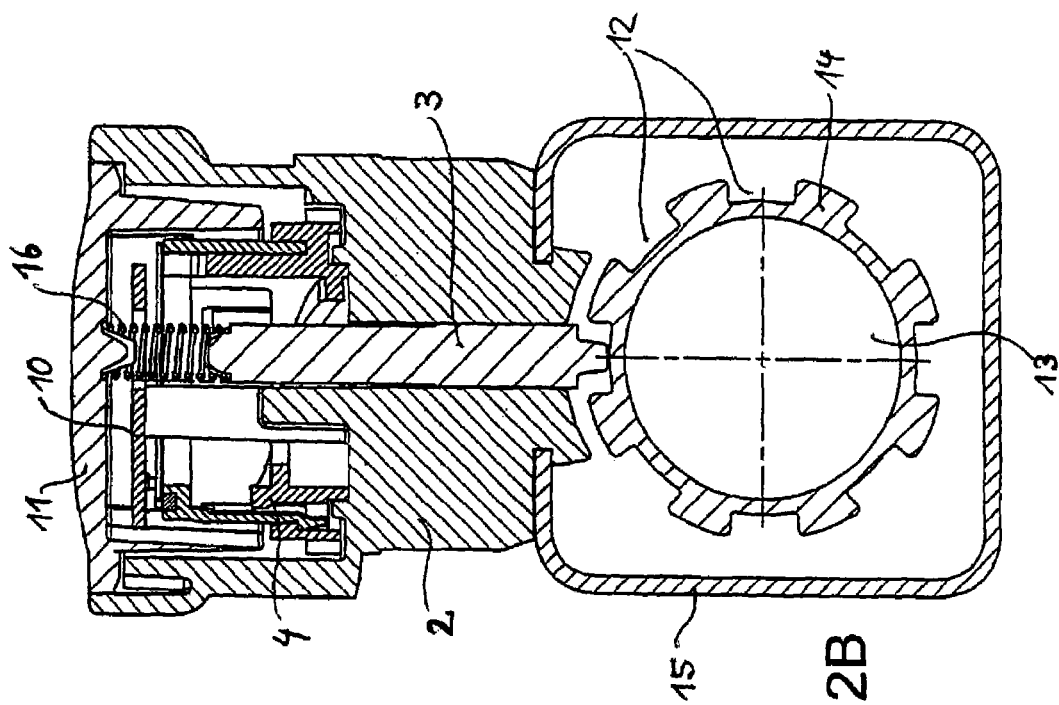
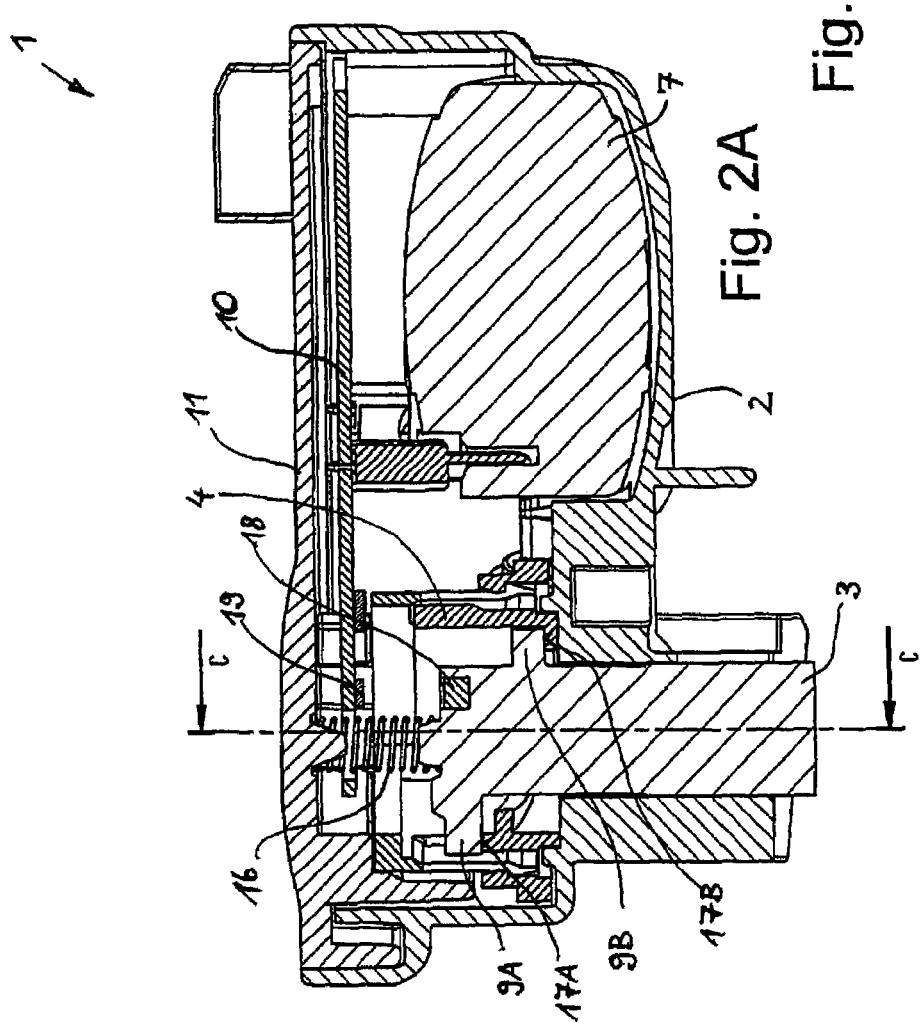
Fig. 2A
Fig. 2B

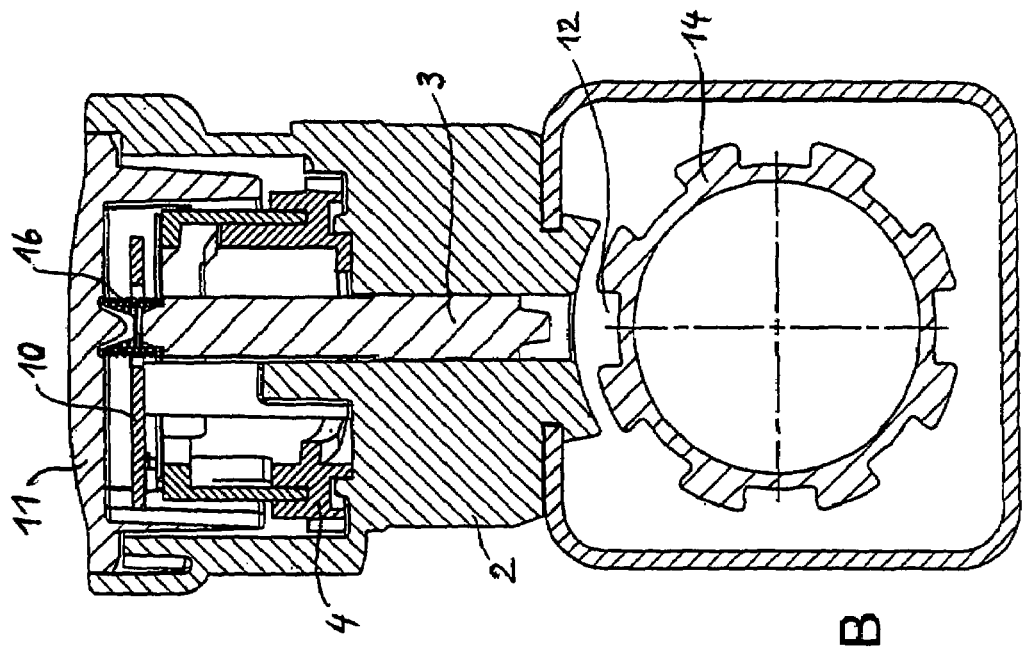
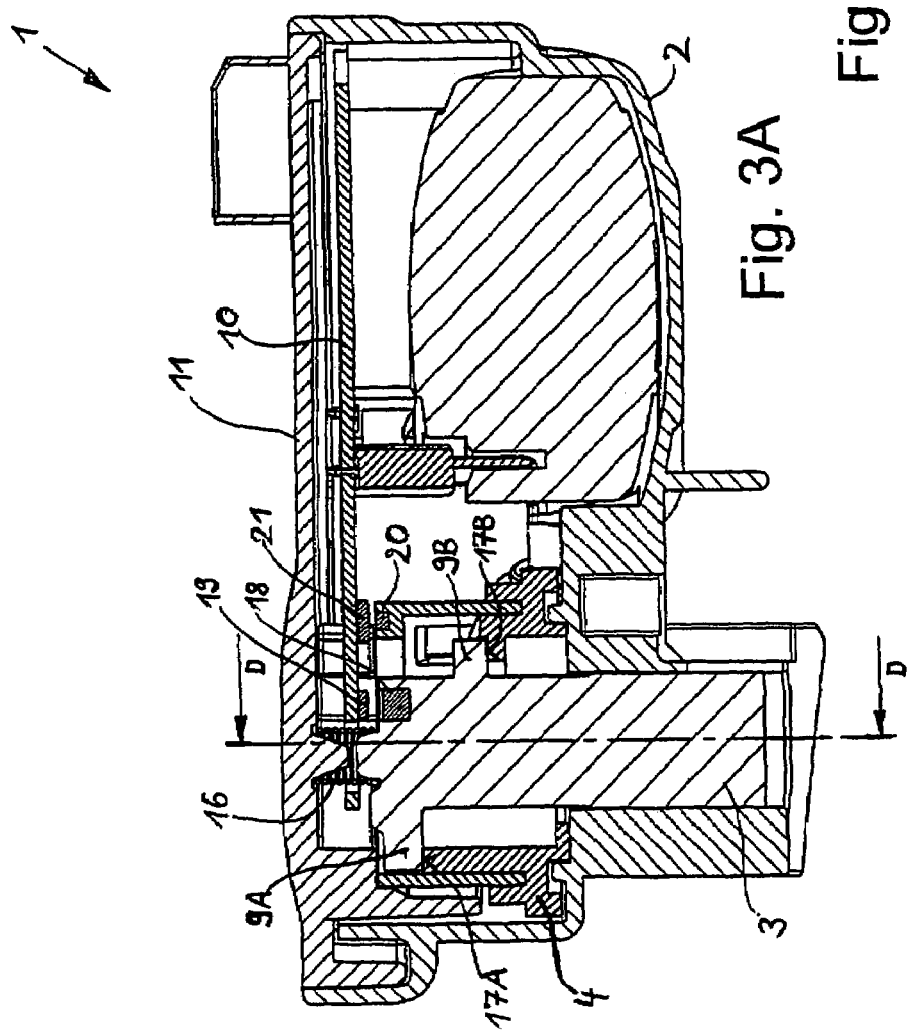
Fig. 3A
Fig. 3B

LOCKING DEVICE FOR A STEERING SHAFT HAVING A SELECTABLE SWITCHING POSITION WHEN THE LOCKING BOLT ARRANGEMENT IS DISPLACED IN THE DIRECTION OF A RELEASE END POSITION

The invention relates to a locking device for a steering shaft with a locking bolt arrangement, a control element which is coupled to the locking bolt arrangement in such a way that the locking bolt arrangement can be displaced in an axial direction thereof between a locking position and a release end position by rotation of the control element, a motor drive for rotation of the control element, an electronic control unit for control of the motor drive and a sensor arrangement which is coupled to the electronic control unit for detection of at least one axial position of the locking bolt arrangement, wherein the electronic control unit switches off the motor drive when the locking bolt arrangement is displaced in the axial direction from the locking position to the release end position and the sensor arrangement emits an output signal which indicates that a switch-off position of the locking bolt arrangement has been reached.

A locking device of the aforementioned type is known for example from the patent specification DE 101 09 609 C1. This document describes a locking device (steering lock) for locking a steering shaft of a motor vehicle by means of a locking bolt which for locking purposes can engage in locking notches of a locking sleeve fixed on the steering shaft. The rectangular locking bolt is mounted so as to be axially displaceable in a channel of a housing. For axial displacement of the locking bolt between the locking position (or latching position) and the unlocking position (or release position) a rotatable control element is provided which is driven by an electric motor. The locking bolt is coupled to the control element via guide means in such a way that the locking bolt moves in the axial direction when the control element rotates. The control element is constructed as a bush-like worm gear with an inner worm and an outer toothing. A driving worm fixed on the shaft of the electric motor engages in the outer toothing. The locking bolt engages with projections in the inner worm of the control element, wherein the projections are pressed in the axial direction against guide surfaces of the inner worm of the control element by a spring force which pushes the locking bolt in the direction of the steering shaft. When the control element rotates, the guide surfaces run away below the projections of the locking bolt, wherein the projections are moved into the locking position or the release position respectively due to a rise or fall of the guide surfaces along a peripheral direction of the control element.

Both ends of the rising or falling guide surfaces of the locking element are adjoined by end faces which lie in a plane perpendicular to the axial direction. As soon as the projections of the locking bolt have reached the end faces as the control element rotates, a further rotation of the control element does not bring about any further axial movement of the locking bolt, since the projections of the locking bolt stay on the end faces in the same axial position (i.e. either the locking position or the release position).

If for example after the release position has been reached the electric motor which drives the control element is not switched off immediately but only after a certain delay, then the flat end faces slide away below the projections of the locking bolt without moving the latter further in the axial direction. Thus running on of the electric motor after the release position is reached would not pose problems so long as the flat end faces adopt a sufficient angle of rotation.

When the unlocking position or release position is reached this is detected with the aid of a mechanical limit switch on which the locking bolt acts directly. If the limit switch is actuated when the unlocking position is reached, then the electric motor is switched off (by a control means coupled to the limit switch and the electric motor). In the known arrangement the position of the locking bolt which initiates the switching off the motor, i.e. the switch-off position, should at the same time correspond to the unlocking or release position in which the projections of the locking bolt rest on the corresponding end faces of the inner worm guide of the control element.

In order to compensate for technological tolerances it is of course necessary to construct the limit switch in such a way that it already generates a switch-off signal when the locking bolt moving into the release position has not yet reached the release end position (with the projections resting on the end face). On the other hand, it could in fact happen that the limit switch does not respond even when the projections of the locking bolt are already resting on the end faces of the control element and do not move further in the axial direction, so that no switch-off signal is generated. Therefore if the limit switch must already respond before the projections of the locking bolt have reached the end faces of the control element, then it must also be ensured that after tripping the limit switch the control element moves further at least until the projections arrive at the end faces. Thus a minimum delay of the motor switch-off should be provided. Thus an exact positioning of the limit switch which initiates the motor switch-off is necessary, which involves increased expenditure on construction.

Alternatively the switch-off signal or brake signal for the electric motor drive could also be derived from a sensor which detects a rotational position of the control element at which, when this position is reached, braking of the motor drive should begin. However, this would necessitate a further rotational position sensor in addition to the sensor for detecting the rotational position which corresponds to the release end position.

The difficulties in the positioning of the limit switch are increased if instead of a mechanical limit switch a binary Hall sensor is used in order to detect the switch-off position of the locking bolt. Because of technological tolerances not only of the binary Hall sensor but also of the permanent magnet which actuates the Hall sensor and its mounting, the distance between the permanent magnet and the surface of the Hall sensor at which the Hall sensor switches over is subject to considerable fluctuations.

The object of the invention is to reduce the requirements with regard to the exact positioning of the sensor which detects the switch-off position of the locking bolt.

This object is achieved according to the invention by a locking device with the features of the independent claim.

According to the invention, in a locking device of the above-referenced type the sensor arrangement is configured in such a way that, at least in one displacement interval of the locking bolt arrangement preceding the release end position and including a desired switch-off position, the output signal can assume a plurality of output signal values which are monotonically dependent upon the axial position in such a way that a selection of the desired switch-off position is possible by selection of corresponding output signal value. Furthermore the electronic control unit has a selection means which enables the selection of an output signal value of said plurality of output signal values as a threshold value, said selected output signal value corresponds to the desired switch-off position, so that when the threshold value is reached, exceeded or is fallen below a signal is emitted causes the motor drive to be switched off. A monotone dependence of the output signal values upon the axial position in the displacement interval should be understood as either a monotonically rising dependence in which the output signal values rise with increasing spacing of the locking bolt arrangement from the steering shaft, or a monotonically falling dependence in which the output signal values fall. A linear dependence between output signal values and a change of path is preferred in the displacement interval but is not essential.

The locking device according to the invention enables the selection of a desired switch-off position after the assembly of the locking device. All that is required is for a suitable interface to be provided on the electronic control unit. An exact positioning of the sensor which detects the axial position of the locking bolt is not necessary, so long as the desired switch-off position can have a corresponding output signal value unequivocally assigned to the desired switch-off position.

The position of the locking bolt arrangement at which the brake signal should be emitted (i.e. the desired switch-off position) is for example set after the assembly of the locking device. Then a reference value which corresponds to the corresponding output signal value is stored. In operation, the braking operation is only initiated when the output signal reaches the reference value during unlocking.

The output signal of the sensor arrangement can for example be a signal which can assume a plurality of discrete values which are each assigned to a specific part-interval of the displacement interval. However, the output signal is preferably an analog output signal which rises monotonically or falls monotonically in the displacement interval. The dependence of the output signal upon the path is preferably at least approximately linear, but can also for example be quadratic or logarithmic. In this preferred embodiment the electronic control unit preferably has an analog/digital converter which converts the analog output signal into a digital output value. Such an analog/digital converter is for example available inexpensively in a controller which is used for implementing the electronic control.

The selection means used in the electronic control unit could be set for example with the aid of a voltage applied to a terminal of the electronic control unit. However, the selection means is preferably programmable, for example using the programs implemented in an available controller.

In the case of a locking device in which the sensor arrangement supplies an analog output signal, the selection means could comprise an analog signal comparator and a reference voltage generator. The analog signal comparator receives the voltage generated by the reference voltage generator and compares it with the analog output signal. The reference voltage of the reference voltage generator could be adjustable or re-programmable with the aid of an external voltage. If—as in a preferred embodiment—the electronic control unit has an analog/digital converter the selection means preferably comprises a comparator which is coupled to the analog/digital converter and compares the digital value corresponding to the analog output signal with a reference value, the reference value being supplied from a reference value memory to the comparator. This function of the digital comparator can also be carried out with the aid of a program executed in a controller.

A preferred modification of the locking device according to the invention is characterised in that the sensor arrangement has at least one Hall sensor which is disposed in such a way that it can detect the approach of a magnet coupled to the locking bolt arrangement at least in a portion of the displacement interval. In this case a plurality of binary Hall sensors could be used which are disposed staggered behind one another in the axial direction and which in the event of a movement of the locking bolt into the release end position are tripped in succession by a magnet. However, the sensor arrangement preferably has an analog Hall sensor which is disposed in such a way that in the displacement interval it emits an output signal which is monotonically dependent upon the axial position. The use of an analog Hall sensor in a locking device is known for example from the patent document DE 199 29 435 C2. There the analog Hall sensor is used in combination with a binary Hall sensor for redundant detection of an unlocking position, wherein the detection range of the analog Hall sensor used there covers both the locking position and the unlocking position. Such a wide detection range is not necessary in the analog Hall sensor which is used for the purposes of the present invention; the detection range of the analog Hall sensor which is advantageously used here merely needs to cover the displacement interval of the locking bolt arrangement which precedes the release end position and encloses the desired switch-off position, wherein the technological tolerances of the installation and the design of the Hall sensor arrangement and of the permanent magnet should be taken into account.

A preferred and advantageous embodiment of the locking device according to the invention is characterised in that the sensor arrangement additionally comprises at least one sensor for detecting a rotational position of the control element. The locking bolt arrangement is preferably guided through an opening in the control element in such a way that the control element is rotatable about the locking device arrangement, wherein a first permanent magnet is fixed on the locking bolt arrangement and as the release end position is approached it approaches an analog first Hall sensor, at least one second permanent magnet being fixed on the upper face of the control element in such a way that it acts on a second Hall sensor when a predetermined rotational position of the control element is reached. It is advantageous if the permanent magnets on the locking bolt arrangement and the control element are disposed in such a way that the analog first Hall sensor and the at least one second Hall sensor can be disposed in one plane. Preferably the first Hall sensor and the at least one second Hall sensor are disposed on a common circuit board. As a result all sensor components and the electronic control unit including the motor control can be accommodated on a circuit board, which simplifies the manufacture. Moreover such an arrangement allows a compact overall height of the locking device.

A preferred modification of the invention is characterised in that the at least one permanent magnet disposed on the control element and the at least one second Hall sensor are disposed in such a way that the rotational positions of the control element which correspond to both the locking position and the release end position of the locking bolt arrangement can be detected. The detection of the two rotational positions of the control element in combination with the detection of the locking bolt position by the analog Hall sensor enable a high degree of reliability of detection of the release position in combination with a reliable motor control, in particular initiating of the braking of the motor at the correct time.

Advantageous and/or preferred modifications of the invention are characterised in the dependent claims.

The invention is explained in greater detail below with reference to a preferred embodiment which is illustrated in the drawings, in which:

FIG. 2A shows the locking device shown in FIG. 1 in a sectional view along the line A-A in the locking position and with the circuit board inserted and the housing cover put on;

FIG. 2B shows the locking device illustrated in FIG. 2A in a sectional view along the line C-C;

FIG. 3A shows the locking device shown in FIG. 1 in a sectional view along the line A-A in the unlocking position and with the circuit board inserted and the housing cover put on;

FIG. 3B shows the locking device illustrated in FIG. 3A in a sectional view along the line D-D;

Figure 1:
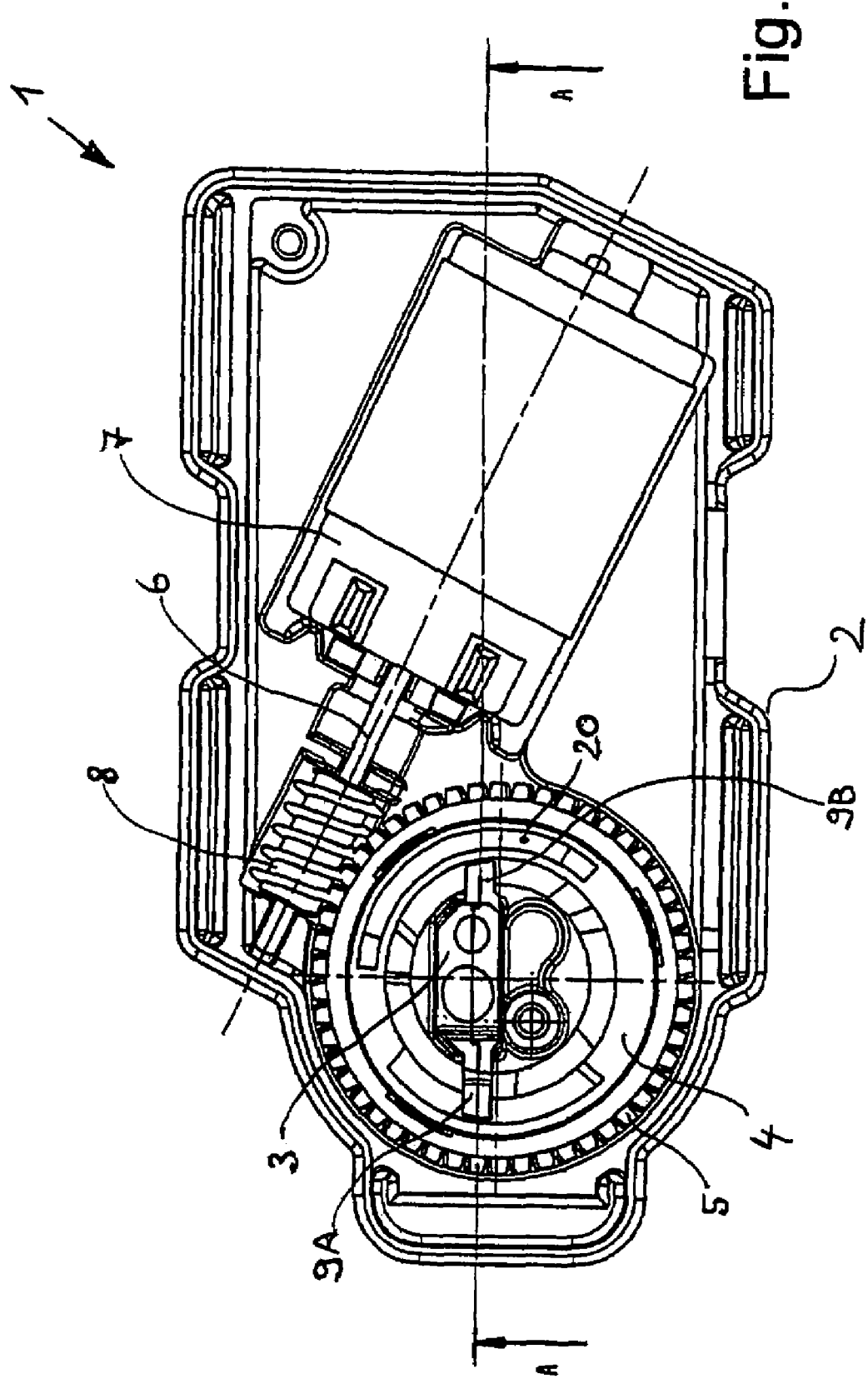
FIG. 1 shows a top view of an embodiment of a locking device according to the invention with the housing cover removed and the electronic control unit circuit board removed.

FIG. 1 shows a top view of an embodiment of the locking device 1 according to the invention with the housing cover removed and the electronic control unit circuit board removed. A housing 2 surrounds a guide and a drive for a locking bolt. With the aid of the drive the locking bolt is moved in its axial direction, whereby in its locking position or latching position it engages in notches in a locking sleeve fixed on a steering shaft in such a way that the steering shaft cannot be rotated. In the release position or unlocking position the locking bolt is withdrawn from the locking notch so that the steering shaft can be rotated. FIG. 1 shows a top view of an end face of the locking bolt 3, in which the axial direction in which the locking bolt 3 moves extends perpendicular to the drawing plane. The rectangular locking bolt 3 is mounted so as to be fixed against rotation in a guide channel which is perpendicular to the drawing plane of FIG. 1. A control element 4 constructed as a bush-like worm gear with an inner worm and an outer toothing surrounds the locking bolt 3. The control element 4 is rotatably mounted. A driving worm 8 fixed on a shaft 6 of an electric motor 7 engages in the outer toothing 5 of the control element 4. The locking bolt 3 engages with projections 9A, 9B in the inner worm of the control element 4, whereby the projections 9A, 9B are pushed in the axial direction against guide surfaces of the inner worm of the control element 4 by a spring force which presses the locking bolt 3 in the direction of the steering shaft. When the control element 4 rotates, the guide surfaces run away below the projections 9A, 9B of the locking bolt 3, whereby the projections 9A, 9B are moved due to the rise of fall of the guide surfaces along the circumferential direction of the control element 4 in the axial direction into the locking position or the release position respectively.

FIGS. 2A, 2B, 3A and 3B show sectional views of the locking device shown in FIG. 1 with the electronic control unit circuit board 10 installed and the housing cover 11 put on. In this case FIGS. 2A and 3A show sectional views along the line A-A in FIG. 1, FIG. 2A showing a sectional view of the locking device 1 in which the locking bolt 3 is located in the locking position whilst FIG. 3A shows a sectional view of the locking device 1 in which the locking bolt 3 is located in the release position. FIG. 2B shows a sectional view of the locking device 1 along the line C-C in FIG. 2A. FIG. 3B shows the sectional view along the line D-D of FIG. 3A. In the representation according to FIG. 1 the locking device is in the release position (unlocked position).

In the locking position illustrated in FIGS. 2A and 2B the locking bolt 3 engages in locking notches 12 of a locking sleeve 14 fixed on the steering shaft 13. The locking sleeve 14 has a plurality of locking nuts 12 which are uniformly distributed along its periphery, extend in the axial direction of the steering shaft 13 and are wider than the front portion of the locking bolt 3 facing the steering shaft 13, so that after being moved towards the steering shaft 13 the locking bolt 3 can engage in a locking notch 12. The engagement of the locking bolt 3 in a locking notch 12 prevents further rotation of the steering shaft 13. The housing 2 of the locking device 1 is fixed in a recess in a casing 15 of the steering column.

A spring 16 which is supported against the housing cover 11 of the locking device 1 pushes the locking bolt 3 in the direction of the steering shaft 13. As a result the faces of the projections 9A and 9B of the locking bolt 3 facing the steering shaft 13 are pressed against guide surfaces 17A, 17B respectively of the control element.

A permanent magnet 18 is fixed on the end face of the locking bolt 3 remote from the steering shaft 13. An analog Hall sensor which is fixed on the circuit board 10 is assigned to this permanent magnet 18. The output voltage supplied by the analog Hall sensor 19 is dependent upon the distance from the permanent magnet 18. In the locking or latching position illustrated in FIGS. 2A and 2B the permanent magnet 18 is the furthest distance possible from the analog Hall sensor 19.

FIGS. 1, 3A and 3B show the locking device in its release or unlocking position. As can be seen from FIG. 3B, the locking bolt 3 is completely withdrawn from the notch 12 in the locking sleeve 14 and is retracted into the housing 2 of the locking device 1. In this release position the permanent magnet 18 fixed on the end face of the locking bolt 3 is as close as possible to the Hall sensor 19. FIG. 3A also shows a further permanent magnet 20 which is fixed in the end face of the control element 4 remote from the steering shaft. This permanent magnet 20 of the control element acts on a further Hall sensor 21 which is likewise fixed on the circuit board 10. The shape of the permanent magnet 20 can be seen in FIG. 1. The permanent magnet 20 extends in a curve along the periphery of the control element 4 and has a north pole at each of its ends and a south pole in the middle. The junctions between the north poles and the south pole are illustrated by a transverse line on the magnet. The Hall sensor 21 reacts when the north/south pole junction of the permanent magnet 20 runs through below the Hall sensor 21. The Hall sensor 21 shows a binary output signal which can assume one of two possible states. With the aid of the Hall sensor 21 and the permanent magnet 20 it is possible to detect the rotational position of the control element 4 which corresponds to the release position or unlocking position. A further Hall sensor (not shown in FIGS. 1 to 3B) is disposed on the circuit board 10 at a position in which in co-operation with the permanent magnet 20 it can detect the rotational position of the control element 4 which corresponds to the locking or latching position.

Figure 4A:
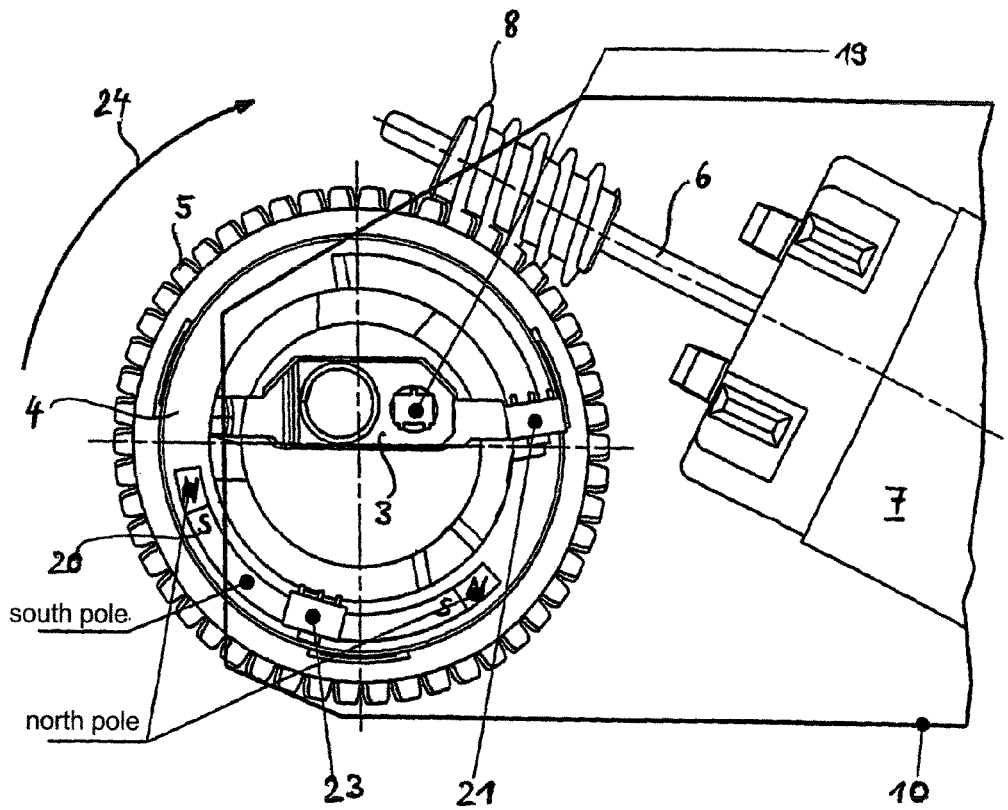
FIGS. 4A to 4C show the locking device shown in FIG. 1 in schematic top views which show the three positions of the control element on the path from the locking position to the release position.
Figure 4B:
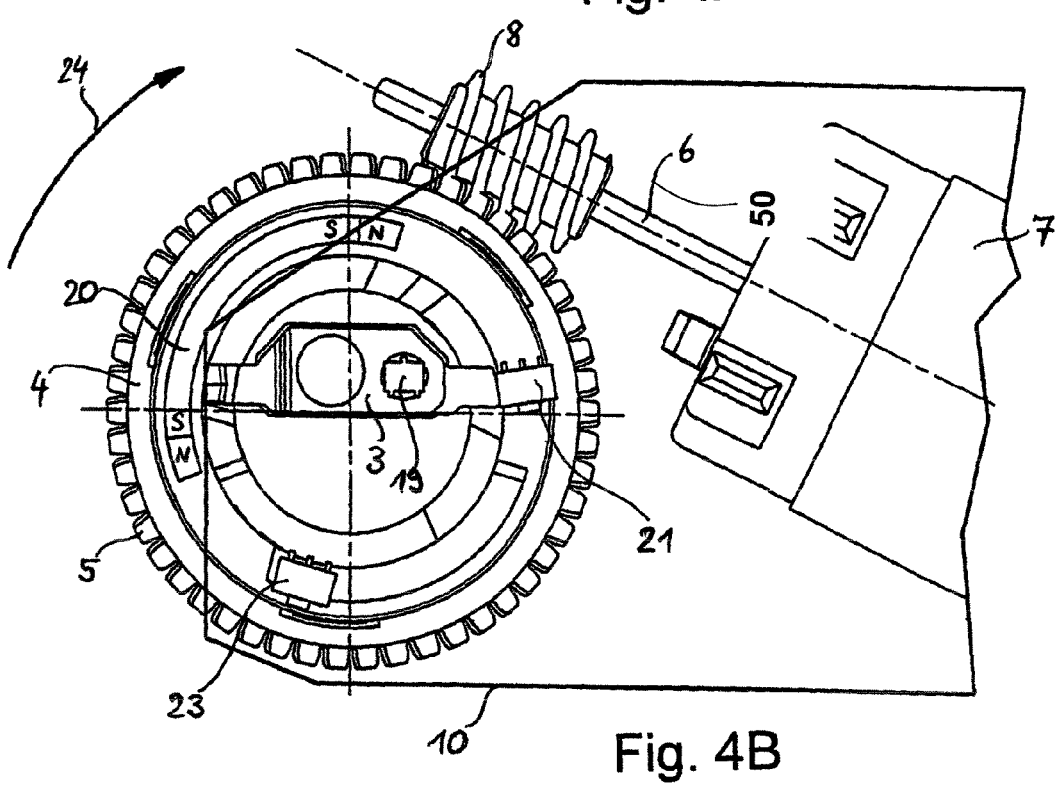
Figure 4C:
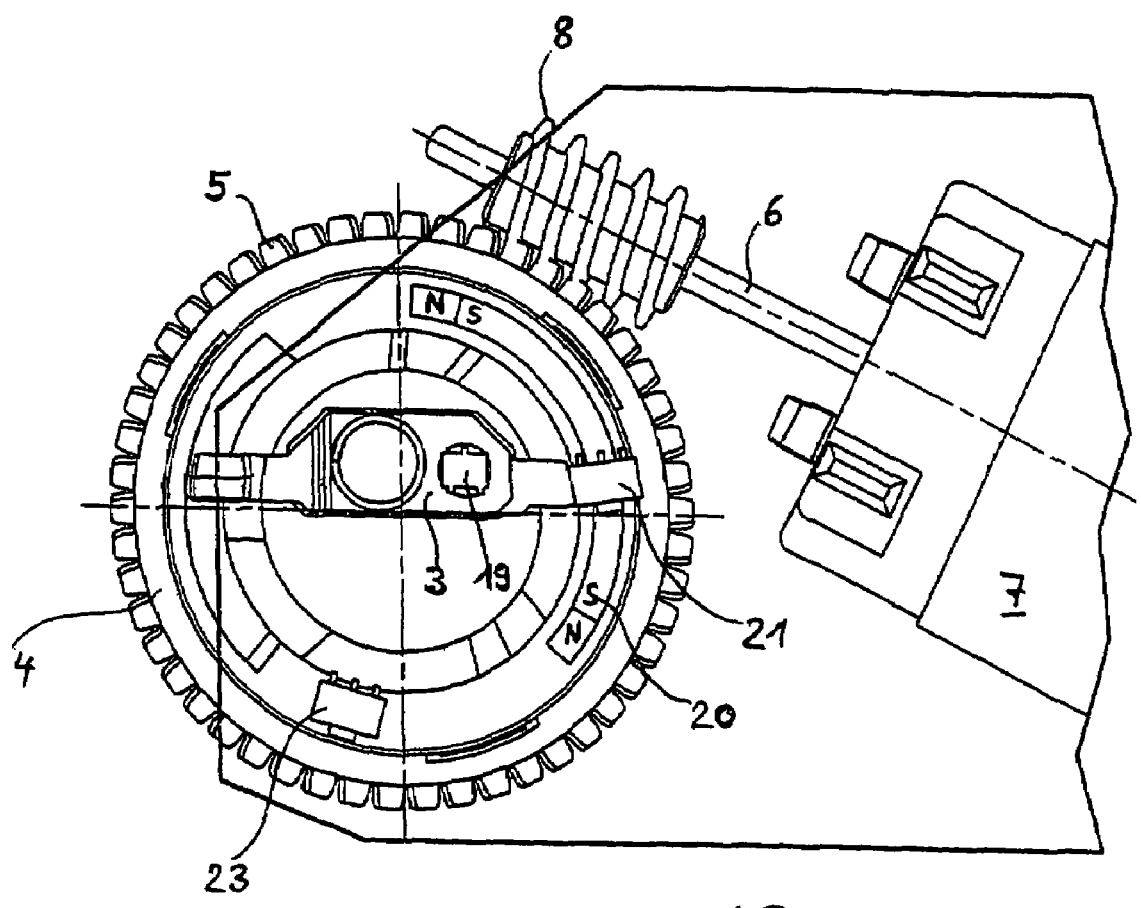

FIGS. 4A to 4C illustrate schematically the detection not only of the release position of the locking bolt 3 but also various rotational positions of the control element 4 by three Hall sensors which co-operate with a permanent magnet accommodated on the end face of the locking bolt 3 and a permanent magnet fixed on the control element. FIGS. 4A to 4B show schematically the electric motor 7 with its drive shaft 6 and the driving worm 8 fixed thereon, and also the control element 4 with the outer toothing 5 in which the driving worm 8 engages. Furthermore the circuit board 10 is shown with the Hall sensors 19, 21 and 23 fixed thereon, as well as the permanent magnets which act on the Hall sensors. The permanent magnet fixed on the end face of the control element 4 extends over a circular arc segment of approximately 96° and has a north pole at each of the ends and a south pole extending between them (the polarity of the permanent magnet can also be reversed).

FIG. 4A shows the locking device in a locking position in which the permanent magnet 20 of the control element 4 is located below the Hall sensor 23. In the position illustrated in FIG. 4A the middle of the permanent magnet 20 is located below the Hall sensor 23. In the locking end position the control element is rotated further by approximately 45° anti-clockwise than is shown in FIG. 4A. In order to arrive at the release position or unlocking position from this locking position the electric motor 7 is controlled so that the control element 4 rotates clockwise in the direction of the arrow 24. In this case the permanent magnet 20 moves further in the clockwise direction so that it leaves the Hall sensor 23 which detects the locking position. A rotational position in which the permanent magnet 20 has left the Hall sensor 23 but has not yet reached the Hall sensor 21 is shown in FIG. 4B. If the control element is rotated further in the clockwise direction, then the permanent magnet 20 finally reaches the sensor 21 in such a way that first of all the north pole and then the north/south pole junction runs through below the Hall sensor 21. Thus the Hall sensor 21 detects that the control element 4 has reached a release position or unlocking position. FIG. 4C shows the arrangement in a release position in which the Hall sensor 21 is located approximately in the middle of the permanent magnet 20. Here too a further rotation in the clockwise direction is possible until the junction of north pole and south pole reaches the Hall sensor 21 (approximately 45° behind the position shown in FIG. 4C).

Simultaneously with the rotation of the control element 4 the locking bolt 3 moves perpendicular to the drawing plane of FIGS. 4A to 40 towards the analog Hall sensor 19. In this case the Hall sensor 19 is positioned and constructed in such a way that its output voltage changes markedly in particular in the interval which precedes the release end position and encompasses the position at which the switching off of the electric motor 7 should be initiated. Due to a delay the rotational movement of the control element does not end immediately at the point where the switch-off position is reached, but somewhat later.

Figure 5:
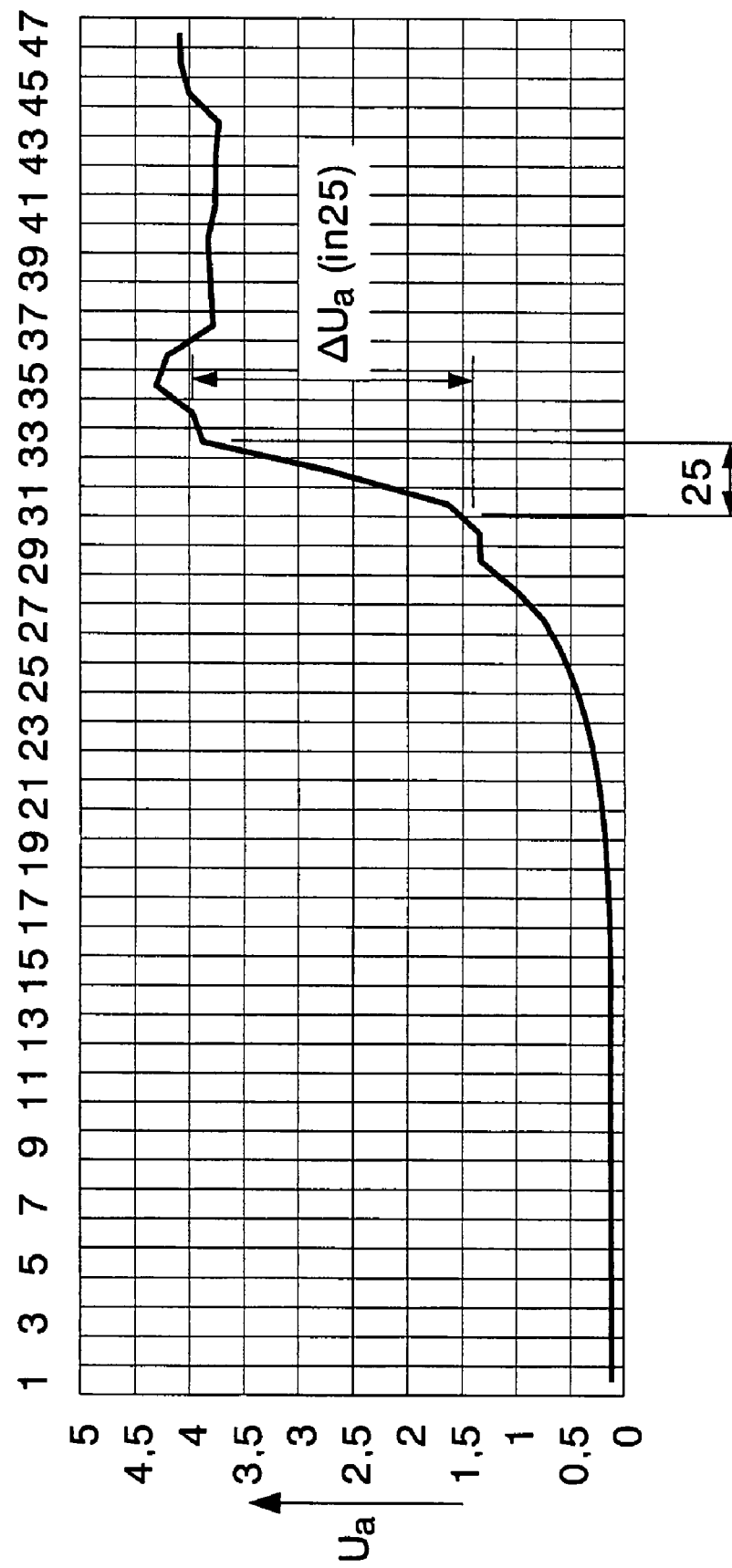
FIG. 5 shows a diagram which shows the dependence of the output voltage of an analog Hall sensor, which detects the approach of a permanent magnet connected to the locking bolt, upon the rotational path of the control element.

The dependence of the output voltage of the analog Hall sensor 19 upon the rotational position of the control element 4 or upon the approach of the permanent magnet 18 of the locking bolt 3 to the Hall sensor 19 is shown by way of example in FIG. 5. In FIG. 5 the output voltage of the analog Hall sensor is plotted over a measurement for the rotational position of the control element 4. The diagram begins on the left-hand side at a locking position of the locking bolt. As the locking bolt now moves slowly out of the locking position, the output voltage initially does not change. In a section 25 before the release end position is reached the output voltage ($U_a$) shows a greater dependence, approximately linear in a certain range, upon the path of the locking bolt. In this case the arrangement of the permanent magnet and of the Hall sensor is chosen so that the interval 25 of the greatest dependence of the output voltage of the analog Hall sensor upon the path travelled by the locking bolt 3 covers a range in which switching off of the electric motor 7 should be initiated.

In the preferred embodiment of the locking device according to the invention the output voltage is supplied to an analog/digital converter, preferably an analog/digital converter in a controller provided on the circuit board 10. The controller also has an input facility with the aid of which it is possible to set the output voltage of the Hall sensor or the output value of the analog/digital converter at which the braking or switch-off sequence for the electric motor 7 should be initiated.

Figure 6:
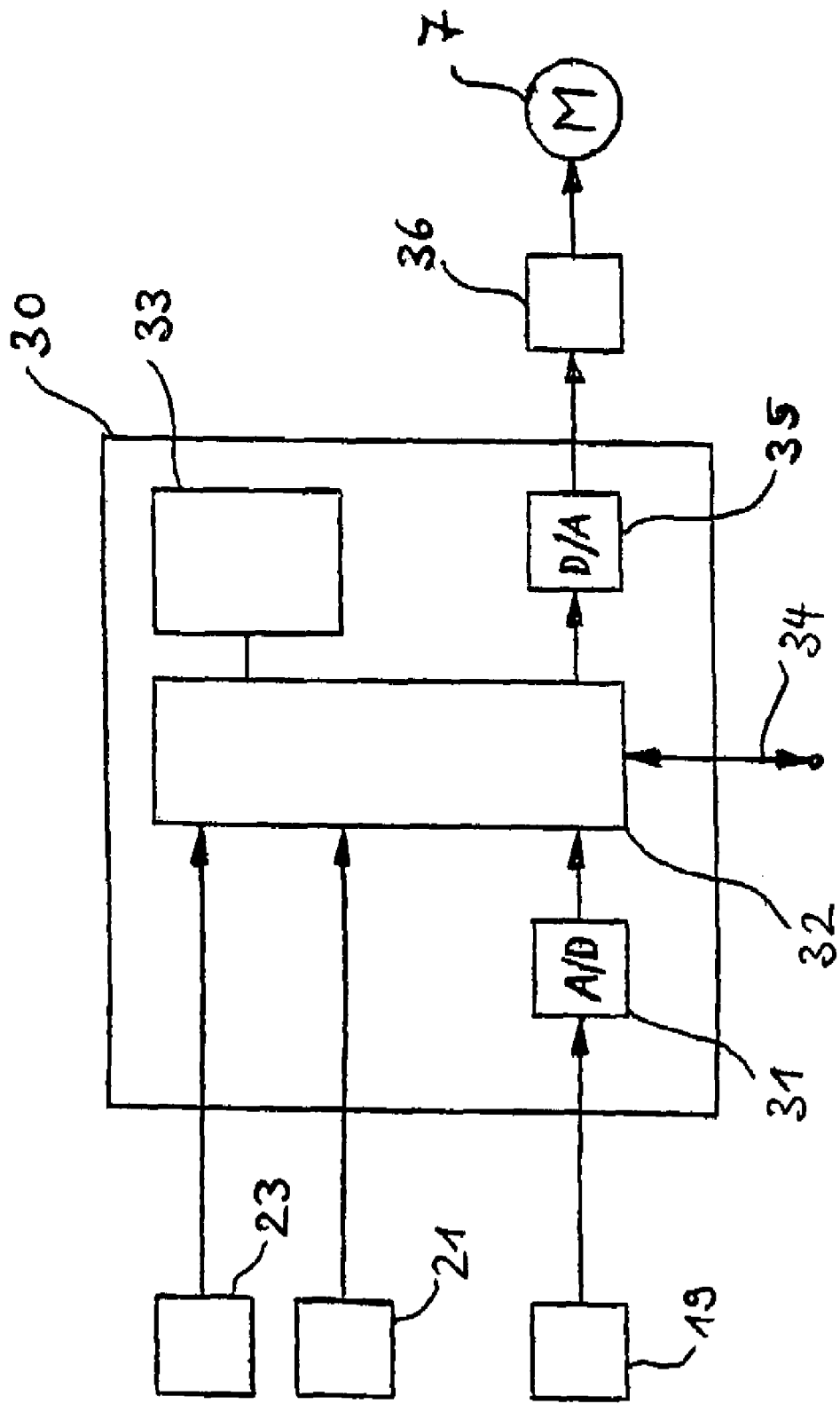
FIG. 6 shows a block diagram of the electronic control unit with sensor arrangement.

FIG. 6 shows a block diagram of the electronic control unit with the coupled Hall sensors and the motor 7. The electronic control unit comprises a controller 30 with a processor 32 and a memory 33. The memory 33 stores both programs and data. The binary Hall sensors 21 and 23 are coupled to binary input ports of the controller 30. The analog Hall sensor 19 is coupled an analog input port. At the analog input port of the controller 30 is located an analog/digital converter 31, the digital output value of which is read by the processor 32. The processor 32 generates a digital output value which corresponds to the desired motor control. The digital output value is input into a digital/analog converter 35. The analog output signal from the digital/analog converter 35 is input into a power driver stage 36 which controls the motor 7. The processor 32 also has various input and output facilities which are illustrated by the arrow 34. The controller 30 can be programmed via these input/output terminals. In particular when the controller 30 is operated according to the invention it is possible to select the output value of the analog/digital converter 31 at which the switching off the motor 7 should be initiated when the locking bolt moves out of the locking position into the release end position.

The invention claimed is:

1. Locking device for a steering shaft comprising:
   a locking bolt arrangement,
   a control element which is coupled to the locking bolt arrangement in such a way that the locking bolt arrangement can be displaced in the axial direction thereof between a locking position and a release end position by rotation of the control element,
   a motor drive for rotation of the control element,
   an electronic control unit for control of the motor drive and
   a sensor arrangement which is coupled to the electronic control unit for detection of at least one axial position of the locking bolt arrangement, wherein the electronic control unit switches off the motor drive when the locking bolt arrangement is displaced in the axial direction from the locking position to the release end position and the sensor arrangement supplies an output signal which indicates that a switch-off position of the locking bolt arrangement has been reached,
   the sensor arrangement being configured in such a way that, at least in one displacement interval of the locking bolt arrangement preceding the release end position and including a desired switch-off position, the output signal ($U_a$) can assume a plurality of output signal values which are monotonically dependent upon the axial position in such a way that a selection of the desired switch-off position is possible by selection of corresponding output signal value, and
   the electronic control unit having a selection means which enables the selection of an output signal value of said plurality of output signal values as a threshold value, said selected output signal value corresponds to the desired switch-off position, so that when the threshold value is reached, exceeded or is fallen below a signal is emitted which causes the motor drive to be switched off.

2. Locking device as claimed in claim 1, wherein the output signal ($U_a$) is an analog output signal which rises monotonically or falls monotonically in the displacement interval.

3. Locking device as claimed in claim 2, wherein the electronic control unit has an analog/digital converter which receives the analog output signal ($U_a$).

4. Locking device as claimed in claim 1, wherein the selection means is programmable.

5. Locking device as claimed in claim 3, wherein the selection means comprises a comparator which is coupled to the analog/digital converter and a reference value memory coupled to the comparator.

6. Locking device as claimed in claim 1, wherein the sensor arrangement has at least one Hall sensor which is disposed in such a way that it can detect the approach of a magnet coupled to the locking bolt arrangement at least in a portion of the displacement interval.

7. Locking device as claimed in claim 6, wherein the sensor arrangement has an analog Hall sensor which is disposed in such a way that in the displacement interval it emits an output signal ($U_a$) which is monotonically dependent upon the axial position.

8. Locking device as claimed in claim 1, wherein the sensor arrangement additionally comprises at least one sensor for detecting a rotational position of the control element.

9. Locking device as claimed in claim 8, wherein the locking bolt arrangement is preferably guided through an opening in the control element in such a way that the control element is rotatable about the locking device arrangement, and further comprising:
   a first permanent magnet that is fixed on the locking bolt arrangement and as the release end position is approached, it approaches an analog first Hall sensor, and
   at least one second permanent magnet that is fixed on the upper face of the control element in such a way that it acts on a second Hall sensor, when a predetermined rotational position of the control element is reached.

10. Locking device as claimed in claim 9, wherein the permanent magnets on the locking bolt arrangement and the control element are disposed in such a way that the analog first Hall sensor and the at least one second Hall sensor can be disposed in one plane.

11. Locking device as claimed in claim 10, wherein the first Hall sensor and the at least one second Hall sensor are disposed on a common circuit board.

12. Locking device as claimed claim 9, wherein the at least one permanent magnet disposed on the control element and the at least one second Hall sensor are disposed in such a way that the rotational positions of the control element which correspond to both the locking position and the release end position of the locking bolt arrangement can be detected.

* * * * *